United States Patent [19]

Lermann et al.

[11] 4,017,879
[45] Apr. 12, 1977

[54] SELF-DEVELOPING TYPE PHOTOGRAPHIC APPARATUS WITH SPREAD ROLLER SYSTEM

[75] Inventors: Peter Lermann, Narring; Günter Fauth, Unterhaching; Herbert Müller, Assling, all of Germany

[73] Assignee: AGFA-Gevaert, A.G., Leverkusen, Germany

[22] Filed: Sept. 29, 1975

[21] Appl. No.: 617,448

[30] Foreign Application Priority Data

Sept. 30, 1974 Germany .......................... 2446595

[52] U.S. Cl. ................................. 354/304; 354/86; 354/318
[51] Int. Cl.² .......................................... G03D 9/02
[58] Field of Search .................... 354/304, 318, 86; 96/76 C

[56] References Cited

UNITED STATES PATENTS

| | | | |
|---|---|---|---|
| 3,742,834 | 7/1973 | Thoenen | 354/304 |
| 3,764,332 | 10/1973 | Harvey | 96/76 C |
| 3,775,127 | 11/1973 | Nerwin | 354/304 X |
| 3,779,144 | 12/1973 | Paglia | 354/304 |
| 3,854,809 | 12/1974 | Driscoll | 354/86 |
| 3,871,010 | 3/1975 | Whall | 354/304 X |
| 3,925,800 | 12/1975 | Whall | 354/86 X |

*Primary Examiner*—Richard L. Moses
*Attorney, Agent, or Firm*—Michael J. Striker

[57] ABSTRACT

A self-developing type photographic apparatus includes a self-developing packet having a pair of juxtaposed sheet elements and a supply of film-processing fluid provided between the sheet elements with at least one of the sheet elements forming part of an area which is to be coated and developed by the fluid. The packet is adapted to be advanced through a pressure-generating gap defined between a pair of juxtaposed rollers. One of the rollers has a rigid sheet-contacting surface, whereas the other of the rollers has an outer resilient material layer. Various embodiments for facilitating the uniform spreading of the film-processing fluid over the film area are disclosed, particularly in the border regions thereof.

12 Claims, 11 Drawing Figures

SELF-DEVELOPING TYPE PHOTOGRAPHIC APPARATUS WITH SPREAD ROLLER SYSTEM

BACKGROUND OF THE INVENTION

The present invention relates to a self-developing type photographic apparatus and, more particularly, to such an apparatus having a spread roller system.

Such photographic self-developing systems have a film packet containing a rectangular film area to be developed and a processing fluid supply. The packet is advanced through a gap of a roller system for spreading the processing fluid over the rectangular area of a film unit.

One of the major more serious problems of such self-developing type systems lies in the distribution of the processing fluid. Typically, the spreading over the entire rectangular film area is not uniform and, particularly, in its border regions. The presence of undeveloped portions, of course, makes the finished picture practically worthless.

To solve this problem, the prior art has proposed placing the processing fluid in pouches between two superposed sheet elements which are secured at their common opposite longitudinal edges by edge-binding brackets. Each bracket has portions which extend inwardly away from the respectively associated longitudinal edge and which lie on the external surfaces of the sheet elements. Thus, the packet has margin portions of a greater thickness than those portions intermediate the longitudinal edges.

During the advancement through the gap of the roller system, a pressure is generated intermediate the sheet elements which must be relieved in their margin portions so that the border regions of the film area can be fully developed.

Thus, circumferentially-extending grooves are provided on opposite ends of a roller which is provided with a deformable outer layer. These grooves provide the aforementioned refief function. However, the width and depth of these grooves are very critical for proper development of the border regions of the film area. The deformable layer is about one-tenth of a millimeter, and the depth of the grooves is typically about one-hundredth of a millimeter. If the depth of a groove is too shallow, longitudinal undeveloped strips are formed; if the depth of the groove is too deep, for example, even one micron oversized, not enough processing fluid will be present to develop the trailing corner regions of the film area. The technical aspects associated with holding the mechanical tolerances of the grooves have proven to be extremely costly and very difficult to reliably achieve and maintain in practice.

SUMMARY OF THE INVENTION

Accordingly, it is the general object of the present invention to overcome the disadvantages of the prior art.

More particularly, it is an object of the present invention to eliminate grooves in the outer deformable rubber layer of the transport roller.

Another object of the present invention is to uniformly spread a constant thickness of film-processing fluid over a film area to be developed, particularly in the border regions of the film area.

A further object of the present invention is to provide a low-cost, reliable spreading distribution system.

In keeping with these objects and features which will become apparent hereinafter, one feature of the photographic apparatus resides in providing self-developing packet means which includes a pair of juxtaposed sheet elements and a supply of film-processing fluid located intermediate the sheet elements. At least one of the sheet elements forms part of an area having border regions which are to be coated and thereby developed by the processing fluid. The packet means is adapted to be advanced through a pressure-generating gap defined between a pair of juxtaposed roller members during the spreading of the fluid. One of the roller members has a first sheet-contacting surface, and the other of the roller members has an outer resilient material layer which forms a second sheet-contacting surface. In addition, various means are located at laterally spaced end regions of the packet means for facilitating the uniform spreading of the fluid over the area and, particularly, in the border regions thereof.

This feature overcomes the above-recited disadvantages and achieves the aforementioned objectives in a novel manner. The undeveloped border regions of the final picture, each of which can be about one millimeter wide, are formed because the packet is thicker at its sides than at its middle region so that the processing fluid is prevented from flowing all the way up to the border regions of the film area.

Optimum picture quality is guaranteed by distributing the processing fluid in a uniform constant thickness by means of the resiliently-tensioned roller system. Of course, the reliable distribution of the processing fluid depends upon many other factors, such as the pressure of the rollers, the temperature and viscosity of the processing fluid, and the film-packet speed of advancement between the rollers just to mention a few. These factors aside, the total quantity of processing fluid is pre-measured so that the picture area can be uniformly coated with as little surplus of processing fluid as possible so as to minimize the cost of development.

Another feature of the invention is to provide a high-friction thin resilient material layer surrounding one of the rollers. This permits the packet to be reliably engaged and advanced through the rollers. The thickness and hardness of the resilient material layer which ages depending upon its use will, of course, influence the uniform distribution of the fluid, as well as the quality of the finished picture.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
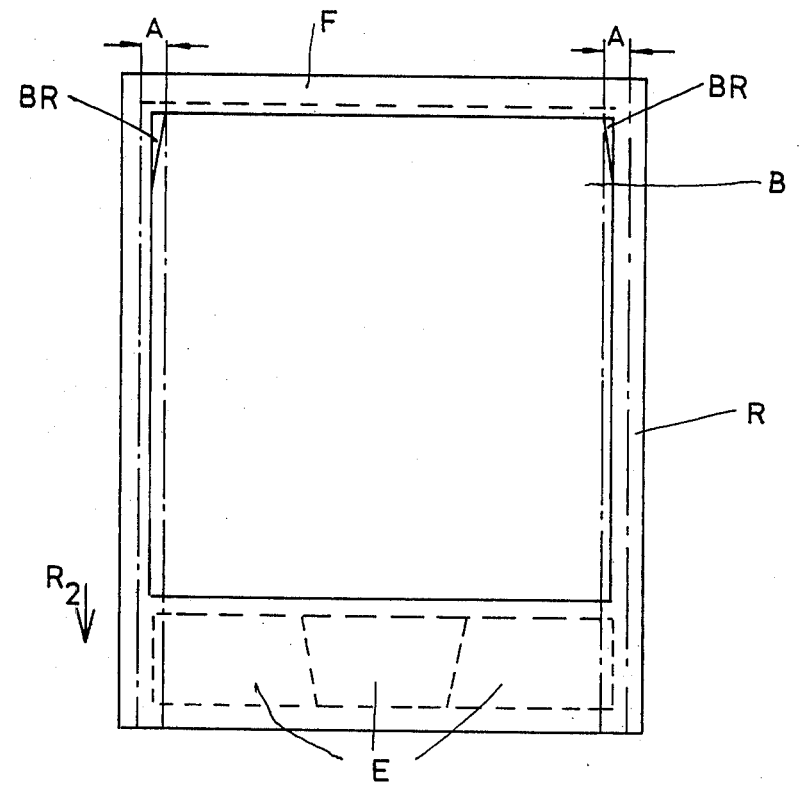
FIG. 1 is a top view of a film packet used in a self-developing type photographic apparatus according to the present invention.

Referring now to the drawing, FIG. 1 is a top view of the film packet for a self-developing type photographic apparatus. The packet is adapted to be advanced through the roller system depicted in FIGS. 2 and 3 in the transport direction indicated by the arrow R2.

At the leading end of the packet, pouches E of film-processing fluid are provided for developing the rectangular film area B. Any excess film-processing fluid left over after spreading has occurred is admitted into the fluid trap F located at the trailing end of the packet.

The packet itself comprises two superposed sheet elements B1, B2 which are secured by edge-binding means or brackets R located at the opposite lateral sides of the packet. Each bracket R overlaps the common longitudinal edges of the sheet elements B1, B2 and has portions which extend inwardly away from the respectively associated longitudinal edge and terminate in lateral edges. Both inwardly-extending portions are located on the exterior surfaces of the sheet elements B1, B2; one inwardly-extending portion K extends inwardly to a greater extent than the other inwardly-extending portion. Thus secured, the packet has margin portions which have a greater relative thickness as compared with the remaining portions intermediate the longitudinal edges of the packet.

The packet is advanced through a pair of rollers. Transport roller TR is resiliently urged against pressure roller AR in conventional manner. The roller pair TR, AR thus defines a pressure-generating gap through which the packet is advanced during spreading of the processing fluid E. The rollers TR, AR are as wide as the packet and squeeze the latter at its sides more strongly than in its middle region so that a gap is formed in the middle region through which the processing fluid E exits.

Pressure roller AR has a first sheet-contacting surface which is preferably constituted of a rigid, smooth metal, such as stainless steel. The transport roller TR is driven by non-illustrated drive means and has an exterior layer G constituted of high-friction, resilient material, such as rubber, which serves as a second sheet-contacting surface.

The transport roller TR has shoulders TB at its opposite ends. Shoulders TB serve to prevent any deformation of the resilient layer G by mounting the latter out of physical contact with the roller AR when no packet is present intermediate the rollers TR, AR. Without the presence of shoulders TB, the layer G would suffer permanent deformation by being pressed in line contact for relatively long periods of time.

Figure 3:
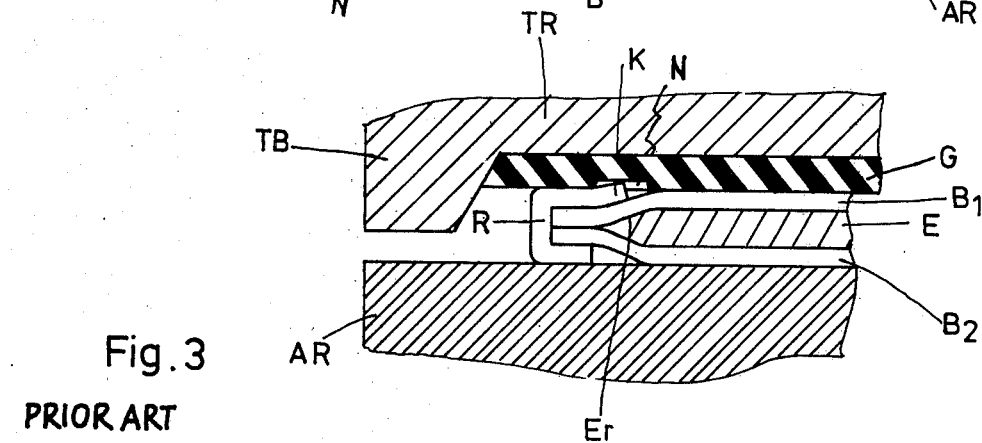
FIG. 3 is a broken-away, sectioned, enlarged view of a detail of FIG. 2.

While advancing through the roller gap, the pouches of processing fluid E rupture and are thereupon spread over the rectangular film area B. The area B has strip-shaped border regions A and trailing corner regions BR. It is these regions which are particularly susceptible to not receiving a proper and uniform distribution of processing fluid E. As shown in FIG. 3, border regions A are located in the area of the margin portions Er of sheet elements B1, B2.

Figure 2:
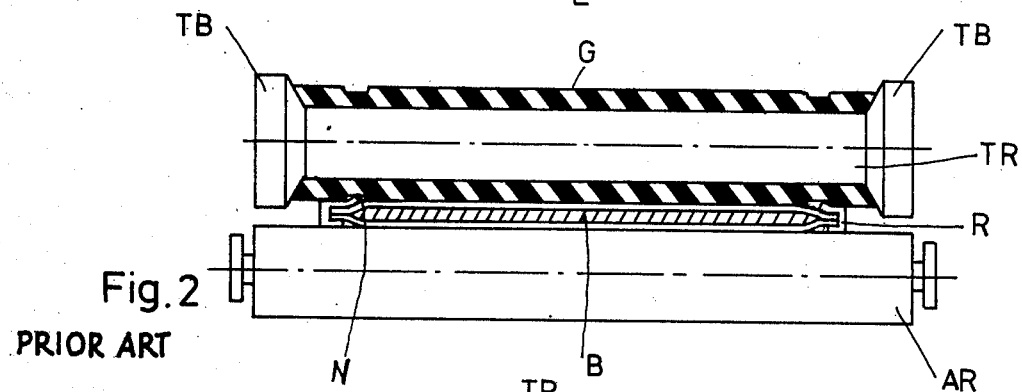
FIG. 2 is a sectional view of the film packet and the roller system according to the prior art.

FIGS. 2 and 3 show the prior-art proposal which was previously discussed herein under the heading "Background of the Invention." Thus, reference character N identifies the circumferentially-extending grooves which relieve the internal pressure developed by the fluid E and thus permitting the portion K to curve upwardly into the groove N. Now the fluid E can flow fully in the margin region Er underneath the portion K. However, the difficulties caused in manufacturing the groove have led the applicants to propose the solutions illustrated in FIGS. 4–11.

Figure 4:
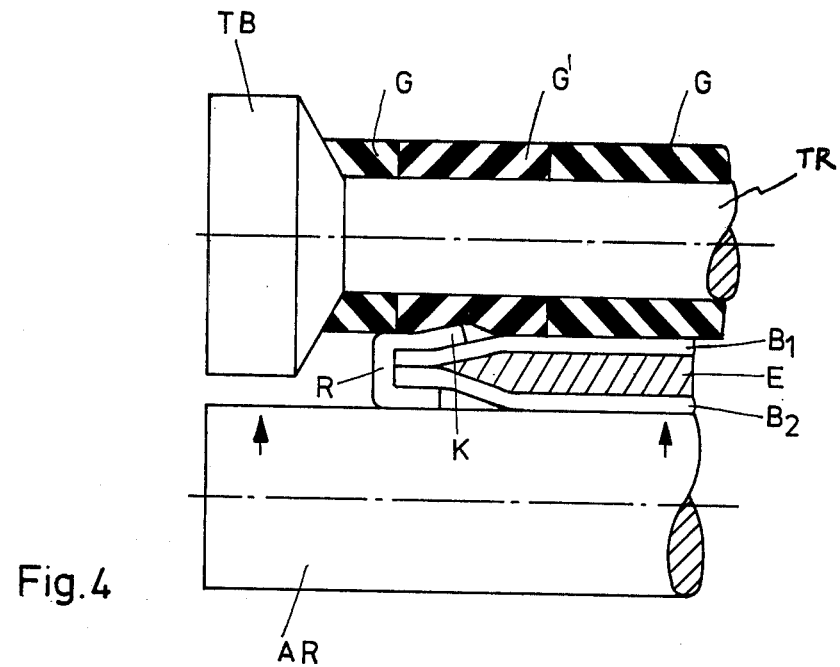
FIG. 4 is a broken-away, partially-sectioned view of a first embodiment of the apparatus according to the invention.

In FIG. 4, the outer deformable layer G surrounding roller TR has a more resiliently-deformable region G' which overlies the marginal end region Er. No grooves are needed; the internal pressure of the fluid E is relieved as the bracket portion K moves radially towards the core of the roller TR. Bracket portion K thus can enter the more resiliently-deformable region G' more deeply than heretofore.

Figure 5:
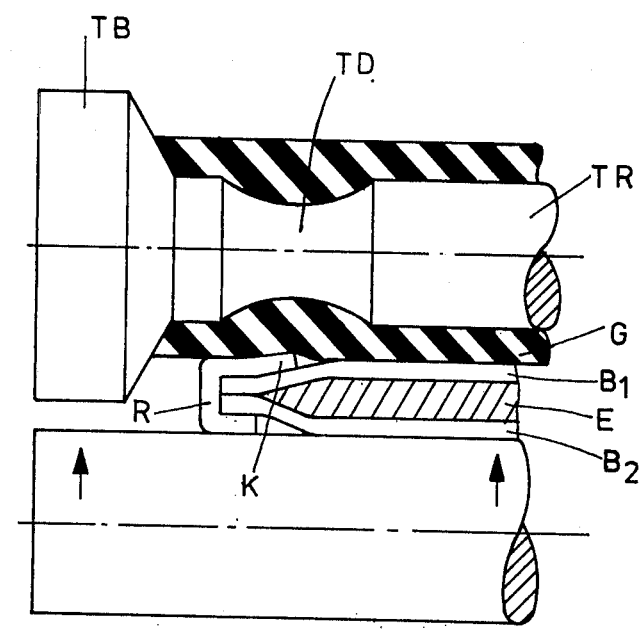
FIG. 5 is a broken-away, partially-sectioned view of a second embodiment of the invention.

In FIG. 5, the core of the roller TR is provided with a circumferentially-extending recess, that is the core has a narrowed region TD. The outer deformable layer G has a uniform resilient characteristic and fills up the recess formed by the narrowed region TD. Since the layer G is relatively thicker in margin region Er, the bracket portion K will readily enter therein.

Figure 6:
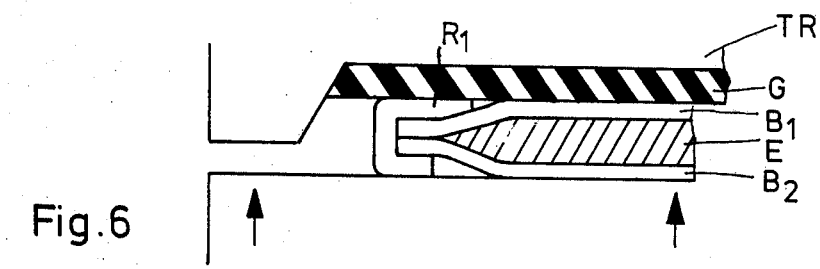
FIG. 6 is a broken-away, partially-sectioned view of a third embodiment of the invention.
Figure 7:
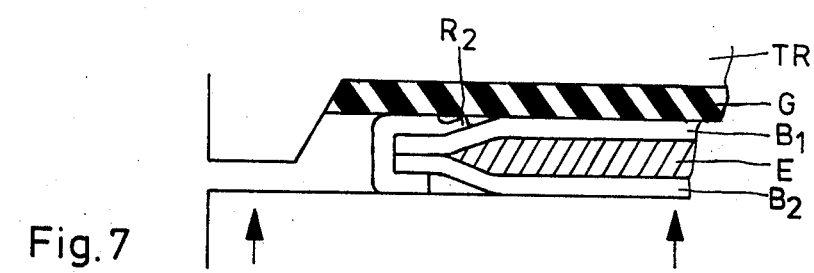
FIG. 7 is a broken-away, partially-sectioned view of a fourth embodiment of the invention.
Figure 8:
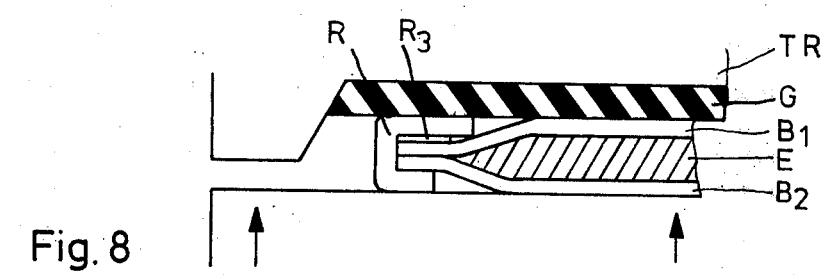
FIG. 8 is a broken-away, partially-sectioned view of a fifth embodiment according to the invention.
Figure 9:
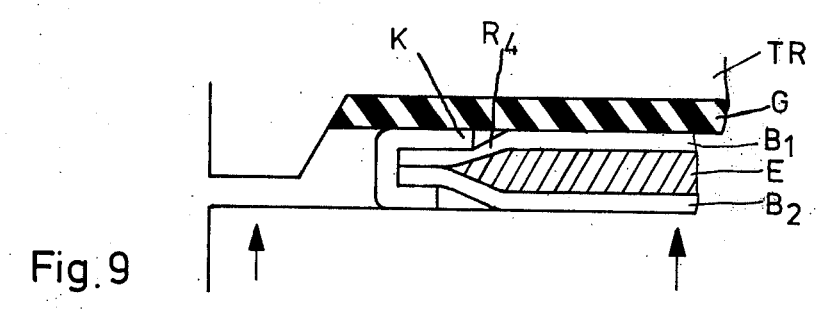
FIG. 9 is a broken-away, partially-sectioned view of a sixth embodiment of the invention.

Instead of modifying the roller TR, it is also desirable to modify the film packet itself. In FIG. 6, the upper inwardly-extending portion has its end region R1 flattened into a wedge shape. In FIG. 7, the upper inwardly-extending portion has its end region R2 cut out. In FIG. 8, a strip R3 is placed intermediate the lower surface of the upper inwardly-extending portion K and the upper surface of the sheet element B1. The longitudinal strip R3 extends laterally for a distance which is short of the extension of the upper inwardly-extending portion K. In FIG. 9, the upper sheet element B1 has a weakened, thinned region R4.

In all of the embodiments of FIGS. 6–9, the upper bracket portion K and/or the sheet element B1 have been effectively weakened so that the internal pressure within the sheets B1, B2 is relieved, whereby the film area B will be uniformly coated, especially in the border regions A and corner regions BR.

Figure 10:
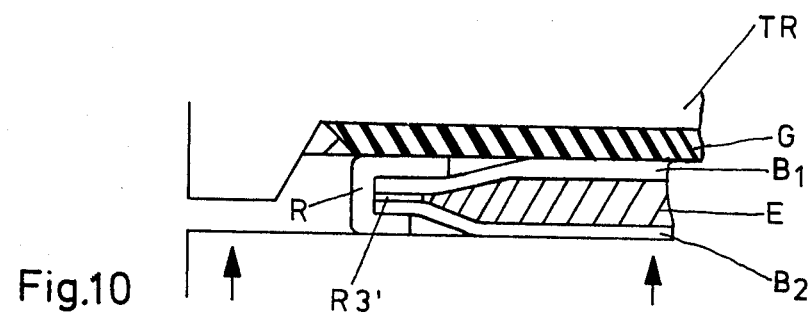
FIG. 10 is a broken-away, partially-sectioned view of a seventh embodiment of the invention.
Figure 11:
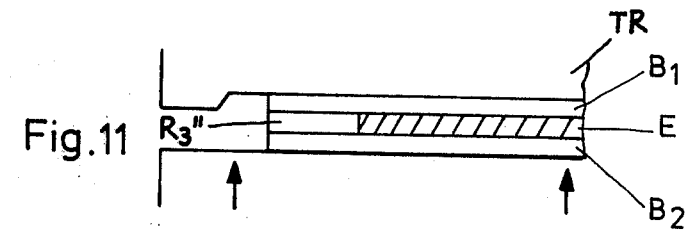
FIG. 11 is a partially-sectioned view of an eighth embodiment of the invention.

FIGS. 10 and 11 show further embodiments of the invention which modify the packet. In FIG. 10, a longitudinal strip R3' is placed intermediate the sheet elements B1, B2. In FIG. 11, the entire edge-binding means or bracket R has been eliminated. A longitudinal strip R3'' is similarly placed intermediate the sheet elements B1, B2 and either glued or welded to the latter so as to make a moisture-proof connection. In both the embodiments of FIGS. 10 and 11, the lateral inner edge formed by the strips R3' or R3'' limits the extent to which it is desired for the fluid E to reach.

It will be further understood that any of the modifications to the packet and any of the modifications to the roller system can be simultaneously utilized to develop the film area.

It will be understood that each of the elements described above, or two or more together, may also find a useful application in other types of constructions differing from the types described above.

While the invention has been illustrated and described as embodied in a self-developing type photographic apparatus with spread roller system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of the prior art, fairly constitute essential characteristics of the generic or specific aspects of this invention.

What is claimed as new and desired to be protected by Letters Patent is set forth in the appended claims.

1. In a photographic apparatus, a combination comprising self-developing film packet means including a pair of juxtaposed sheet elements having margin portions and a supply of film-processing fluid provided intermediate said sheet elements, at least one of the sheet elements forming part of an area having border regions to be coated and thereby developed by said fluid; a pair of juxtaposed roller members defining a pressure-generating gap therebetween through which said packet means is adapted to be advanced during spreading of said fluid, one of said roller members having a first sheet-contacting surface and the other of said roller members having an outer resilient material layer forming a second sheet contacting surface; means for facilitating the uniform spreading of said fluid over said area and being located at laterally-spaced side regions of said packet means for permitting said fluid to flow over said border regions of said area; and edge-binding means for securing the opposite side regions of said juxtaposed sheet elements, each of said edge-binding means overlapping the longitudinal edges and the external surfaces of said sheet elements and having bracket portions extending inwardly away from the respectively associated longitudinal edge, one of said bracket portions projecting inwardly to a greater extent than the other of said bracket portions, said margin portions in part overlying said border regions together with said longer bracket portions, at least one of said sheet elements and said one longer bracket portion being weakened.

2. A combination as defined in claim 1, wherein said facilitating means comprises more deformable regions in the laterally-spaced side regions of said other roller which respectively permits respective ones of said longer bracket portions to enter therein.

3. A combination as defined in claim 2, wherein each of said more deformable regions comprises a highly-resilient layer overlying the border regions of said film area and being substantially more flexible than said adjacent layer of outer resilient material in said other roller, said highly-resilient layer and said adjacent resilient layer being of uniform thickness.

4. A combination as defined in claim 1, wherein said longer bracket portion is flattened into a wedge shape.

5. A combination as defined in claim 1, wherein said longer bracket portion has a cut-out section.

6. A combination as defined in claim 1, and further comprising a longitudinal strip element interposed between said longer bracket portion and said packet means and extending laterally inwardly to a lesser extent relative to said longer bracket portion.

7. A combination as defined in claim 1, wherein one of said sheet elements has a thinned region.

8. A combination as defined in claim 1, and further comprising a longitudinal strip element interposed between said juxtaposed sheet elements and extending inwardly away from said longitudinal edge so as to terminate in a lateral inner edge which defines the maximum extent for said fluid to flow in said border regions of said film area.

9. A combination as defined in claim 1, and further comprising a longitudinal strip element interposed between said sheet elements and extending laterally inwardly so as to terminate in a lateral inner edge which defines the maximum extent for said fluid to flow in said border regions; and means for securing said strip to said sheet elements in a moisture-proof connection.

10. In a photographic apparatus, as combination comprising self-developing film packet means including a pair of juxtaposed sheet elements and a supply of film-processing fluid provided intermediate said sheet elements, at least one of the sheet elements forming part of an area having border regions to be coated and thereby developed by said fluid; a pair of juxtaposed roller members defining a pressure-generating gap therebetween through which said packet means is adapted to be advanced during spreading of said fluid, one of said roller members having a first sheet-contacting surface and the other of said roller members having an outer resilient material layer forming a second sheet-contacting surface; edge-binding means for securing laterally spaced opposite side regions of said juxtaposed sheet elements, each of said edge-binding means overlapping the longitudinal edges and the external surfaces of said sheet elements and having bracket portions extending inwardly away from the respectively associated longitudinal edge, one of said bracket portions projecting inwardly to a greater extent than the other of said bracket portions; and means for facilitating the uniform spreading of said fluid over said area and being located at the laterally-spaced side regions of said packet means for permitting said fluid to flow over said border regions of said area, said facilitating means having more deformable regions in the laterally-spaced side regions of said other roller which respectively permits respective ones of said longer bracket portions to enter therein, each of said more deformable regions having a highly-resilient layer overlying the border regions of said film area and being substantially more flexible than said adjacent layer of outer resilient material in said other roller, said highly-resilient layer and said adjacent resilient layer being of uniform thickness.

11. A combination as defined in claim 10, wherein said other roller has a cylindrical core which has laterally spaced circumferentially-extending recesses, said outer resilient material layer filling said recesses and thus being of non-uniform thickness.

12. A combination as defined in claim 10, wherein said juxtaposed sheet elements have margin portions which in part overly said border regions together with said longer bracket portions, at least one of said sheet elements and said one longer bracket portion being weakened.

* * * * *